United States Patent [19]

Kani et al.

[11] Patent Number: 5,027,193
[45] Date of Patent: Jun. 25, 1991

[54] SYSTEM FOR TRANSMITTING A DIGITAL VIDEO SIGNAL INCLUDING TIME CODE SIGNALS

[75] Inventors: Tetsuo Kani; Takao Inoue, both of Kanagawa, Japan

[73] Assignee: Sony Corporation, Tokyo, Japan

[21] Appl. No.: 512,822

[22] Filed: Apr. 23, 1990

[30] Foreign Application Priority Data

Apr. 28, 1989 [JP] Japan .................................. 1-110317

[51] Int. Cl.[5] .................... H04N 11/06; H04N 9/89; H04N 9/79; G11B 5/02
[52] U.S. Cl. .................................. 358/12; 358/320; 358/310; 360/22
[58] Field of Search ................. 358/12, 310, 311, 320; 360/22, 27

[56] References Cited

U.S. PATENT DOCUMENTS

| | | | |
|---|---|---|---|
| 4,456,930 | 7/1984 | Hashimoto | 358/320 |
| 4,712,143 | 12/1987 | Kawakami et al. | 358/311 |
| 4,777,539 | 10/1988 | Nomura et al. | 360/27 |

Primary Examiner—James J. Groody
Assistant Examiner—Wendy R. Greening
Attorney, Agent, or Firm—Alvin Sinderbrand; William S. Frommer

[57] ABSTRACT

In the transmission of digital video data signals, for example, in a digital video tape recorder, a luminance signal and first and second chrominance signals, such as R-Y and B-Y, are individually sampled to provide respective digital luminance data signals and first and second digital chrominance data signals for forming a high-definition video picture. Time code data signals representing the corresponding frame including the sampled signals are provided as individual sets of identical signals. The digital luminance data signals and the first and second digital chrominance data signals are divided into respective sets thereof which each consist of two successive data signals. The sets of time code data signals, digital luminance and first and second digital chrominance data signals are distributed into a plurality of transmission channels in such a manner that each set of digital luminance data signals is interleaved between sets of the first and second digital chrominance data signals, respectively, in each of the transmission channels and that each of the sets of time code data signals is likewise distributed into each of the channels. Further, one of the two successive data signals in each of the sets of digital luminance data signals, first and second digital chrominance data signals and time code data signals is inverted for obtaining the complement of the one of the two successive data signals in each set which has been inverted, thereby substantially minimizing any DC or low-frequency component in each of the transmission channels.

7 Claims, 20 Drawing Sheets

FIG. 4

| Cont. \ Output | 3-bit control data | | | | | | | |
|---|---|---|---|---|---|---|---|---|
| | 0 | 1 | 2 | 3 | 4 | 5 | 6 | 7 |
| O8 | I8 | I7 | I6 | I5 | I4 | I3 | I2 | I1 |
| O7 | I7 | I6 | I5 | I4 | I3 | I2 | I1 | I8 |
| O6 | I6 | I5 | I4 | I3 | I2 | I1 | I8 | I7 |
| O5 | I5 | I4 | I3 | I2 | I1 | I8 | I7 | I6 |
| O4 | I4 | I3 | I2 | I1 | I8 | I7 | I6 | I5 |
| O3 | I3 | I2 | I1 | I8 | I7 | I6 | I5 | I4 |
| O2 | I2 | I1 | I8 | I7 | I6 | I5 | I4 | I3 |
| O1 | I1 | I8 | I7 | I6 | I5 | I4 | I3 | I2 |

FIG. 5

| | | | | | | | | | | | | | | | BARREL SHIFTER INPUT |
|---|---|---|---|---|---|---|---|---|---|---|---|---|---|---|---|
| Ya 1, Ya 2, Ya 3, Ya 4, Ya 5, Ya 6, Ya 7, Ya 8, Ya 9, Ya10, Ya11, Ya12, Ya13, Ya14, | —I1 |
| Ba 1, Ba 3, Ba 5, Ba 7, Ra 1, Ra 3, Ra 5, Ra 7, Ba 9, Ba11, Ba13, Ba15, | —I5 |
| Yb 1, Yb 2, Yb 3, Yb 4, Yb 5, Yb 6, Yb 7, Yb 8, Yb 9, Yb10, Yb11, Yb12, Yb13, Yb14, | —I2 |
| Bb 1, Bb 3, Bb 5, Bb 7, Rb 1, Rb 3, Rb 5, Rb 7, Bb 9, Bb11, Bb13, Bb15, | —I6 |
| Yc 1, Yc 2, Yc 3, Yc 4, Yc 5, Yc 6, Yc 7, Yc 8, Yc 9, Yc10, Yc11, Yc12, Yc13, Yc14, | —I3 |
| Bc 1, Bc 3, Bc 5, Bc 7, Rc 1, Rc 3, Rc 5, Rc 7, Bc 9, Bc11, Bc13, Bc15, | —I7 |
| Yd 1, Yd 2, Yd 3, Yd 4, Yd 5, Yd 6, Yd 7, Yd 8, Yd 9, Yd10, Yd11, Yd12, Yd13, Yd14, | —I4 |
| Bd 1, Bd 3, Bd 5, Bd 7, Rd 1, Rd 3, Rd 5, Rd 7, Bd 9, Bd11, Bd13, Bd15, | —I8 |

FIG. 6A

OUTPUT OF BARREL SHIFTER

| 3-BIT CONTROL DATA | 0 0 0 | 0 0 1 | 0 1 0 | 0 1 1 | 1 0 0 | 1 0 1 | 1 1 0 |
|---|---|---|---|---|---|---|---|
| 01 | Ya 1, Ya 2, Ba 1, Yb 5, Yb 6, Rb 1, Rb 3, Yc 9, Yc 10, Bc 9, Bc 11, Yd 13, Yd 14, · |
| 02 | Yb 3, Yb 4, Bb 5, Bb 7, Yc 7, Yc 8, Rc 5, Rc 7, Yd 11, Yd 12, Bd 13, Bd 15, · |
| 03 | Yb 1, Yb 2, Bb 1, Bb 3, Yc 5, Yc 6, Rc 1, Rc 3, Yd 9, Yd 10, Bd 9, Bd 11, Ya 13, Ya 14, · |
| 04 | Yc 3, Yc 4, Bc 5, Bc 7, Yd 7, Yd 8, Rd 5, Rd 7, Ya 11, Ya 12, Ba 13, Ba 15, · |
| 05 | Yc 1, Yc 2, Bc 1, Bc 3, Yd 5, Yd 6, Rd 1, Rd 3, Ya 9, Ya 10, Ba 9, Ba 11, Yb 13, Yb 14, · |
| 06 | Yd 3, Yd 4, Bd 5, Bd 7, Ya 7, Ya 8, Ra 5, Ra 7, Yb 11, Yb 12, Bb 13, Bb 15, · |
| 07 | Yd 1, Yd 2, Bd 1, Bd 3, Ya 5, Ya 6, Ra 1, Ra 3, Yb 9, Yb 10, Bb 9, Bb 11, Yc 13, Yc 14, · |
| 08 | Ya 3, Ya 4, Ba 5, Ba 7, Yb 7, Yb 8, Rb 5, Rb 7, Yc 11, Yc 12, Bc 13, Bc 15, · |

FIG. 6B

OUTPUT OF DELAY CIRCUIT

| 3-BIT CONTROL DATA TO SHIFTER | 0 | 0 | 1 | 1 | 2 | 2 | 3 | 3 | 4 | 4 | 5 | 5 | 6 | 6 |
|---|---|---|---|---|---|---|---|---|---|---|---|---|---|---|
| DA1 | Ya 1, | Ya 2, | Ba 1, | Ba 3, | Yb 5, | Yb 6, | Rb 1, | Rb 3, | Yc 9, | Yc10, | Bc 9, | Bc11, | Yd13, | Yd14, |
| DA2 | Yb 3, | Yb 4, | Bb 5, | Bb 7, | Yc 7, | Yc 8, | Rc 5, | Rc 7, | Yd11, | Yd12, | Bd13, | Bd15, | | |
| DA3 | Yb 1, | Yb 2, | Bb 1, | Bb 3, | Yc 5, | Yc 6, | Rc 1, | Rc 3, | Yd 9, | Yd10, | Bd 9, | Bd11, | Ya13, | Ya14, |
| DA4 | Yc 3, | Yc 4, | Bc 5, | Bc 7, | Yd 7, | Yd 8, | Rd 5, | Rd 7, | Ya11, | Ya12, | Ba13, | Ba15, | | |
| DA5 | Yc 1, | Yc 2, | Bc 1, | Bc 3, | Yd 5, | Yd 6, | Rd 1, | Rd 3, | Ya 9, | Ya10, | Ba 9, | Ba11, | Yb13, | Yb14, |
| DA6 | Yd 3, | Yd 4, | Bd 5, | Bd 7, | Ya 7, | Ya 8, | Ra 5, | Ra 7, | Yb11, | Yb12, | Bb13, | Bb15, | | |
| DA7 | Yd 1, | Yd 2, | Bd 1, | Bd 3, | Ya 5, | Ya 6, | Ra 1, | Ra 3, | Yb 9, | Yb10, | Bb 9, | Bb11, | Yc13, | Yc14, |
| DA8 | Ya 3, | Ya 4, | Ba 5, | Ba 7, | Yb 7, | Yb 8, | Rb 5, | Rb 7, | Yc11, | Yc12, | Bc13, | Bc15, | | |

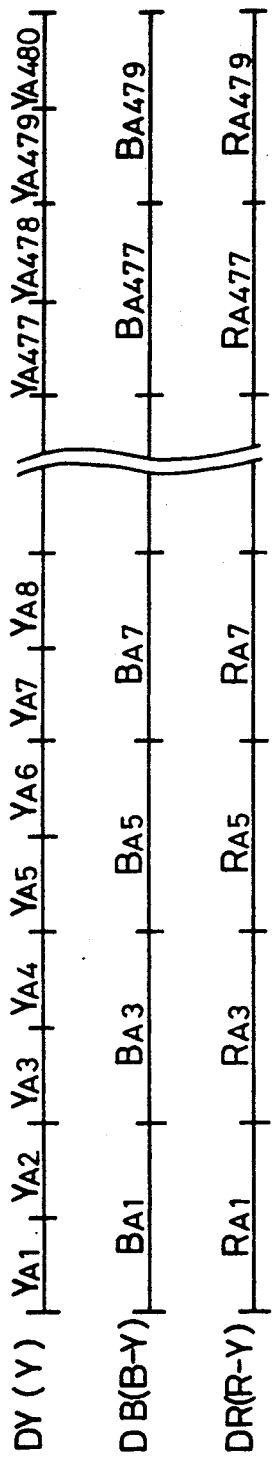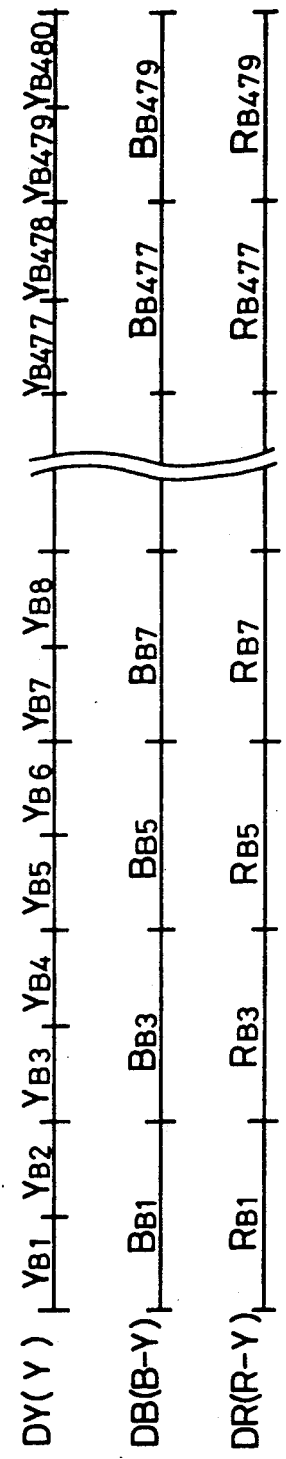
FIG. 7A
FIG. 7B

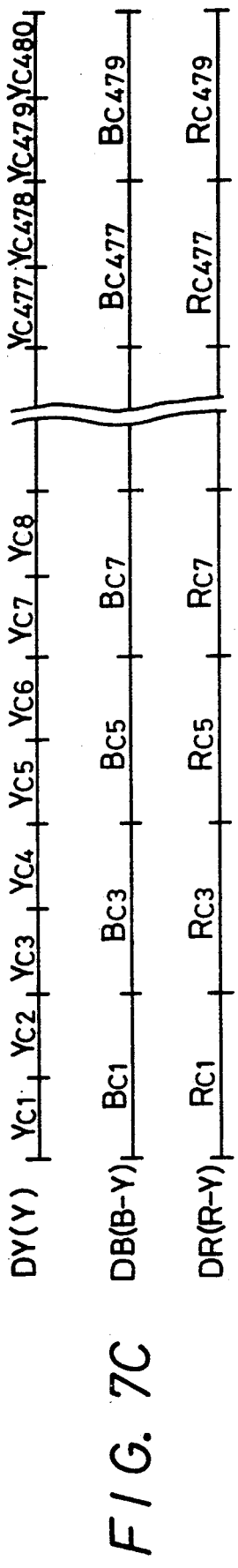

FIG. 8

| | | | | | | | | | | | | | | | | | | |
|---|---|---|---|---|---|---|---|---|---|---|---|---|---|---|---|---|---|---|
| DATA 1 | YA3 | YA4 | BA5 | BA7 | YB7 | YB8 | RB5 | RB7 | YC11 | YC12 | BC13 | BC15 | YD15 | YD16 | · · |
| DATA 2 | YA1 | YA2 | BA1 | BA3 | YB5 | YB6 | RB1 | RB3 | YC9 | YC10 | BC9 | BC11 | YD13 | YD14 | · · |
| DATA 3 | YB3 | YB4 | BB5 | BB7 | YC7 | YC8 | RC5 | RC7 | YD11 | YD12 | BD13 | BD15 | YA15 | YA16 | · · |
| DATA 4 | YB1 | YB2 | BB1 | BB3 | YC5 | YC6 | RC1 | RC | YD9 | YD10 | BD9 | BD11 | YA13 | YA14 | · · |
| DATA 5 | YC3 | YC4 | BC5 | BC7 | YD7 | YD8 | RD5 | RD7 | YA11 | YA12 | BA13 | BA15 | YB15 | YB16 | · · |
| DATA 6 | YC1 | YC2 | BC1 | BC3 | YD5 | YD6 | RD1 | RD3 | YA9 | YA10 | BA9 | BA11 | YB13 | YB14 | · · |
| DATA 7 | YD3 | YD4 | BD5 | BD7 | YA7 | YA8 | RA5 | RA7 | YB11 | YB12 | BB13 | BB15 | YC15 | YC16 | · · |
| DATA 8 | YD1 | YD2 | BD1 | BD3 | YA5 | YA6 | RA1 | RA3 | YB9 | YB10 | BB9 | BB11 | YC13 | YC14 | · · |

FIG. 9

|  | LINE 1 | LINE 2 | LINE 3 | LINE 4 | LINE 5 | LINE 6 | LINE 7 | LINE 8 | ... |
|---|---|---|---|---|---|---|---|---|---|
| CH1 | DATA 1 | DATA 4 | DATA 7 | DATA 2 | DATA 5 | DATA 8 | DATA 3 | DATA 6 | ... |
| CH2 | DATA 2 | DATA 5 | DATA 8 | DATA 3 | DATA 6 | DATA 1 | DATA 4 | DATA 7 | ... |
| CH3 | DATA 3 | DATA 6 | DATA 1 | DATA 4 | DATA 7 | DATA 2 | DATA 5 | DATA 1 | ... |
| CH4 | DATA 4 | DATA 7 | DATA 2 | DATA 5 | DATA 8 | DATA 3 | DATA 6 | DATA 2 | ... |
| CH5 | DATA 5 | DATA 8 | DATA 3 | DATA 6 | DATA 1 | DATA 4 | DATA 7 | DATA 3 | ... |
| CH6 | DATA 6 | DATA 1 | DATA 4 | DATA 7 | DATA 2 | DATA 5 | DATA 8 | DATA 4 | ... |
| CH7 | DATA 7 | DATA 2 | DATA 5 | DATA 8 | DATA 3 | DATA 6 | DATA 1 | DATA 5 | ... |
| CH8 | DATA 8 | DATA 3 | DATA 6 | DATA 1 | DATA 4 | DATA 7 | DATA 2 | DATA 6 | ... |

FIG. 10

|        | 1   | 2   | 3   | 4   | 5   | 6   | 7   | 8   | 9   | 10  | 11  | 12  | 13  | 14  | 15  |     |
|--------|-----|-----|-----|-----|-----|-----|-----|-----|-----|-----|-----|-----|-----|-----|-----|-----|
| LINE 1 | CH2 | CH2 | CH1 | CH1 | CH8 | CH8 | CH7 | CH7 | CH6 | CH6 | CH5 | CH5 | CH4 | CH4 | CH3 | .   |
| LINE 2 | CH7 | CH7 | CH6 | CH6 | CH5 | CH5 | CH4 | CH4 | CH3 | CH3 | CH2 | CH2 | CH1 | CH1 | CH8 | .   |
| LINE 3 | CH4 | CH4 | CH3 | CH3 | CH2 | CH2 | CH1 | CH1 | CH8 | CH8 | CH7 | CH7 | CH6 | CH6 | CH5 | .   |
| LINE 4 | CH1 | CH1 | CH8 | CH8 | CH7 | CH7 | CH6 | CH6 | CH5 | CH5 | CH4 | CH4 | CH3 | CH3 | CH2 | .   |
| LINE 5 | CH6 | CH6 | CH5 | CH5 | CH4 | CH4 | CH3 | CH3 | CH2 | CH2 | CH1 | CH1 | CH8 | CH8 | CH7 | .   |
| LINE 6 | CH3 | CH3 | CH2 | CH2 | CH1 | CH1 | CH8 | CH8 | CH7 | CH7 | CH6 | CH6 | CH5 | CH5 | CH4 | .   |
| LINE 7 | CH8 | CH8 | CH7 | CH7 | CH6 | CH6 | CH5 | CH5 | CH4 | CH4 | CH3 | CH3 | CH2 | CH2 | CH1 | .   |
| LINE 8 | CH5 | CH5 | CH4 | CH4 | CH3 | CH3 | CH2 | CH2 | CH1 | CH1 | CH8 | CH8 | CH7 | CH7 | CH6 | .   |
| LINE 9 | CH2 | CH2 | CH1 | CH1 | CH8 | CH8 | CH7 | CH7 | CH6 | CH6 | CH5 | CH5 | CH4 | CH4 | CH3 | .   |
| .      |     |     |     |     |     |     |     |     |     |     |     |     |     |     |     |     |

FIG. 13A

| H\L | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | FF | 7F | BF | DF | EF | F7 | FB | FD | FE | FC | FA | F6 | EE | DE | BE | 7E |
| 1 | 7D | BD | DD | ED | F5 | F9 | F3 | EB | DB | BB | 7B | 77 | B7 | D7 | E7 | CF |
| 2 | AF | 6F | 5F | 9F | 3F | 7C | BC | DC | EC | F4 | F8 | F2 | EA | DA | BA | 7A |
| 3 | 76 | B6 | D6 | E6 | CE | AE | 6E | 5E | 9E | 3E | 79 | B9 | D9 | E9 | F1 | E5 |
| 4 | D5 | B5 | 75 | 6D | AD | CD | 9D | 5D | 3D | 73 | B3 | D3 | E3 | CB | AB | 6B |
| 5 | 5B | 9B | 3B | 67 | A7 | C7 | 97 | 57 | 37 | 2F | 8F | 4F | 1F | 3C | 5C | 6C |
| 6 | 74 | 78 | B8 | B4 | AC | 9C | D8 | D4 | CC | E8 | E4 | F0 | E2 | D2 | B2 | 72 |
| 7 | 6A | AA | CA | 9A | 5A | 3A | 36 | 56 | 66 | A6 | 96 | C6 | 8E | 4E | 2E | 1E |
| 8 | E1 | D1 | B1 | 71 | 39 | 69 | 59 | 99 | A9 | C9 | C5 | A5 | 65 | 35 | 55 | 95 |
| 9 | 8D | 4D | 2D | 1D | 0F | 1B | 17 | 33 | 2B | 27 | 63 | 53 | 4B | 47 | 87 | 8B |
| A | 93 | A3 | C3 | E0 | B0 | 70 | D0 | C8 | A8 | 68 | 38 | 58 | 98 | C4 | 64 | A4 |
| B | 94 | 54 | 34 | 1C | 2C | 4C | 8C | C2 | A2 | 62 | 32 | 52 | 92 | 8A | 4A | 2A |
| C | 1A | 0E | 16 | 26 | 46 | 86 | C1 | 61 | A1 | 91 | 51 | 31 | 19 | 29 | 49 | 89 |
| D | 85 | 45 | 25 | 15 | 0D | 07 | 0B | 13 | 23 | 43 | 83 | C0 | 60 | A0 | 90 | 50 |
| E | 30 | 18 | 28 | 48 | 88 | 84 | 44 | 24 | 14 | 0C | 06 | 0A | 12 | 22 | 42 | 82 |
| F | 81 | 41 | 21 | 11 | 09 | 05 | 03 | 01 | 02 | 04 | 08 | 10 | 20 | 40 | 80 | 00 |

FIG. 13B

| H\L | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 00 | 80 | 40 | 20 | 10 | 08 | 04 | 02 | 01 | 03 | 05 | 09 | 11 | 21 | 41 | 81 |
| 1 | 82 | 42 | 22 | 12 | 0A | 06 | 0C | 14 | 24 | 44 | 84 | 88 | 48 | 28 | 18 | 30 |
| 2 | 50 | 90 | A0 | 60 | C0 | 83 | 43 | 23 | 13 | 0B | 07 | 0D | 15 | 25 | 45 | 85 |
| 3 | 89 | 49 | 29 | 19 | 31 | 51 | 91 | A1 | 61 | C1 | 86 | 46 | 26 | 16 | 0E | 1A |
| 4 | 2A | 4A | 8A | 92 | 52 | 32 | 62 | A2 | C2 | 8C | 4C | 2C | 1C | 34 | 54 | 94 |
| 5 | A4 | 64 | C4 | 98 | 58 | 38 | 68 | A8 | C8 | D0 | 70 | B0 | E0 | C3 | A3 | 93 |
| 6 | 8B | 87 | 47 | 4B | 53 | 63 | 27 | 2B | 33 | 17 | 1B | 0F | 1D | 2D | 4D | 8D |
| 7 | 95 | 55 | 35 | 65 | A5 | C5 | C9 | A9 | 99 | 59 | 69 | 39 | 71 | B1 | D1 | E1 |
| 8 | 1E | 2E | 4E | 8E | C6 | 96 | A6 | 66 | 56 | 36 | 3A | 5A | 9A | CA | AA | 6A |
| 9 | 72 | B2 | D2 | E2 | F0 | E4 | E8 | CC | D4 | D8 | 9C | AC | B4 | B8 | 78 | 74 |
| A | 6C | 5C | 3C | 1F | 4F | 8F | 2F | 37 | 57 | 97 | C7 | A7 | 67 | 3B | 9B | 5B |
| B | 6B | AB | CB | E3 | D3 | B3 | 73 | 3D | 5D | 9D | CD | AD | 6D | 75 | B5 | D5 |
| C | E5 | F1 | E9 | D9 | B9 | 79 | 3E | 9E | 5E | 6E | AE | CE | E6 | D6 | B6 | 76 |
| D | 7A | BA | DA | EA | F2 | F8 | F4 | EC | DC | BC | 7C | 3F | 9F | 5F | 6F | AF |
| E | CF | E7 | D7 | B7 | 77 | 7B | BB | DB | EB | F3 | F9 | F5 | ED | DD | BD | 7D |
| F | 7E | BE | DE | EE | F6 | FA | FC | FE | FD | F8 | F7 | EF | DF | BF | 7F | FF |

FIG. 14A

| Y$_{A3}$ | Y$_{A4}$ | B$_{A5}$ | B$_{A7}$ | Y$_{B7}$ | Y$_{B8}$ |
|---|---|---|---|---|---|
| 00100001 | 00100010 | 10000000 | 10000001 | 10101011 | 10100111 |
| 10010000 | 10100000 | 00011110 | 00101110 | 10100111 | 00110111 | data1 : data 0 = 4 : 12    data1 : data 0 = 8 : 8    data1 : data 0 = 10 : 6

FIG. 14B (shown above combined with 14A)

FIG. 14C

| | | | | | |
|---|---|---|---|---|---|
| 10010000 | 01011111 | 00011110 | 11010001 | 10100111 | 11001000 | data 1 : data 0 = 8 : 8    data 1 : data 0 = 8 : 8    data : data 0 = 8 : 8

| D0-D15, Ds0-Ds1 | | ASCII * 2 |
|---|---|---|
| 0 | (0 0 0 0) | 60H |
| 1 | (0 0 0 1) | 62H |
| 2 | (0 0 1 0) | 64H |
| 3 | (0 0 1 1) | 66H |
| 4 | (0 1 0 0) | 68H |
| 5 | (0 1 0 1) | 6AH |
| 6 | (0 1 1 0) | 6CH |
| 7 | (0 1 1 1) | 6EH |
| 8 | (1 0 0 0) | 70H |
| 9 | (1 0 0 1) | 72H |
| 0AH | (1 0 1 0) | 82H |
| 0BH | (1 0 1 1) | 84H |
| 0CH | (1 1 0 0) | 86H |
| 0DH | (1 1 0 1) | 88H |
| 0EH | (1 1 1 0) | 8AH |
| 0FH | (1 1 1 1) | 8CH |

FIG. 18

| VITC DATA | ADDRESSES OF VITC DATA | VITC DATA | ADDRESSES OF VITC DATA |
|---|---|---|---|
| D0 | A0 ~ A15 | D9 | A144 ~ A159 |
| D1 | A16 ~ A31 | D10 | A160 ~ A175 |
| D2 | A32 ~ A47 | D11 | A176 ~ A191 |
| D3 | A48 ~ A63 | D12 | A192 ~ A207 |
| D4 | A64 ~ A79 | D13 | A208 ~ A223 |
| D5 | A80 ~ A95 | D14 | A224 ~ A239 |
| D6 | A96 ~ A111 | D15 | A240 ~ A255 |
| D7 | A112 ~ A127 | Ds0 | A256 ~ A271 |
| D8 | A128 ~ A143 | Ds1 | A272 ~ A287 |

FIG. 19

BARREL SHIFTER INPUT

OUTPUT OF DELAY CIRCUIT

| 3-BIT CONTROL DATA TO SHIFTER | 0 | 0 | 1 | 2 | 2 | 3 | 3 | 4 | 4 | 5 | 5 | 6 | 6 |
|---|---|---|---|---|---|---|---|---|---|---|---|---|---|
| DA1 | D0, | D0, | —, | —, | D1, | —, | —, | D2, | D2, | —, | —, | —, | D3 ... |
| DA2 | D0, | D0, | —, | —, | D1, | —, | —, | D2, | D2, | —, | —, | D3, | D3 ... |
| DA3 | D0, | D0, | —, | —, | D1, | —, | —, | D2, | D2, | —, | —, | D3, | D3 ... |
| DA4 | D0, | D0, | —, | —, | D1, | —, | —, | D2, | D2, | —, | —, | D3, | D3 ... |
| DA5 | D0, | D0, | —, | —, | D1, | —, | —, | D2, | D2, | —, | —, | D3, | D3 ... |
| DA6 | D0, | D0, | —, | —, | D1, | —, | —, | D2, | D2, | —, | —, | D3, | D3 ... |
| DA7 | D0, | D0, | —, | —, | D1, | —, | —, | D2, | D2, | —, | —, | D3, | D3 ... |
| DA8 | D0, | D0, | —, | —, | D1, | —, | —, | D2, | D2, | —, | —, | D3, | D3 ... |

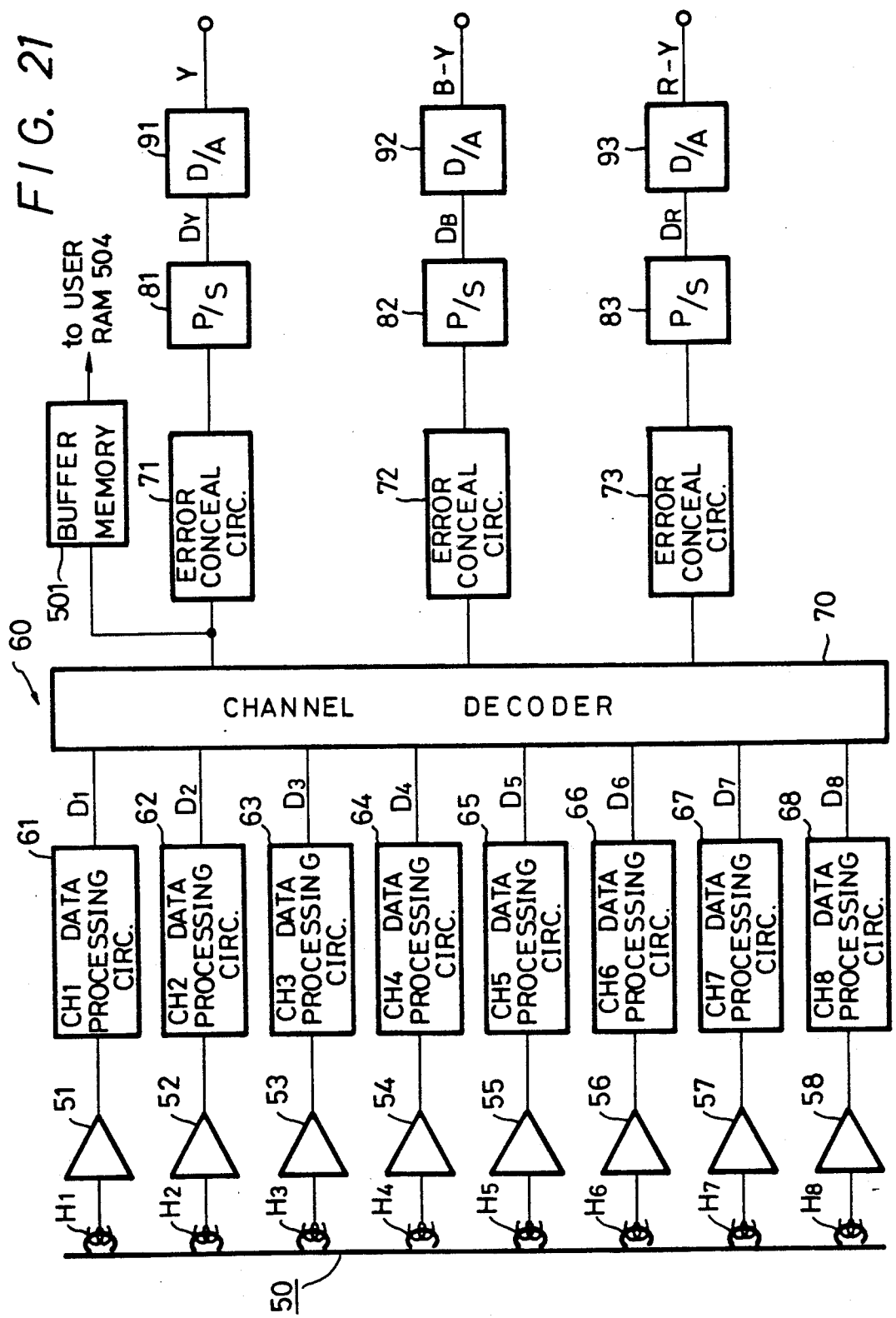

SYSTEM FOR TRANSMITTING A DIGITAL VIDEO SIGNAL INCLUDING TIME CODE SIGNALS

BACKGROUND OF THE INVENTION

1. Field of the Invention

The present invention generally relates to the transmission of digital video data signals and more particularly, is applicable to data transmission in a digital video tape recorder (D-VTR) or the like which digitally records and reproduces high definition television (HDTV) video signals.

2. Description of the Prior Art

High definition television (HDTV) techniques are known for enhancing the resolution of the video image by widening the transmission band relative to that of the standard NTSC (National Television System Committee) or similar system, thereby achieving improved image quality. Telecasting based on such HDTV techniques is currently under study along with development of digital video tape recorders (D-VTR) capable of recording and reproducing HDTV video signals in a digitized form.

In a D-VTR which digitally records and reproduces HDTV video signals having a transmission band far wider than that of the standard NTSC video signals, a great amount of video data has to be processed at a high speed, and it is difficult, with existing devices and circuit technology, to provide a circuit arrangement that is adequate for directly processing such video signals. Therefore, it has been proposed heretofore to adopt a data processing method in which the processing speed is reduced by distributing the video data into a number of channels for performing parallel operations thereon. For example, in a publication entitled "An Experimental HDTV Digital VTR With A Bit Rate of 1.188 Gbps", authored by persons having an obligation to assign to the assignee of the present application and appearing in "IEEE Transactions on Broadcasting" December, 1987, Vol. BC33, No. 4, at pages 203-209, a scheme for effecting parallel data transmission is shown to involve division of the HDTV picture, at vertically contiguous segments of the picture, whereupon the horizontal time axis of each segment is expanded, as in a memory, so as to reduce the signal processing speed for each picture segment. By using such a picture division method, the correlation between picture elements (pixels) can be fully utilized, that is, a digital filter can be provided for each divided picture so as to permit error concealment in the event of errors lying outside the error correcting ability of circuits provided therefor. More specifically, in the signal processing system being here described, the luminance signal Y and two chrominance signals R-Y and B-Y are individually sampled to provide a 4:2:2 signal format, that is, every other R-Y and B-Y signal output is dropped or the chrominance signals are subsampled at a lower sampling frequency than the luminance signal, whereupon the Y and remaining R-Y and B-Y signals for each segment are multiplexed, coded for error corrections and then converted to serial form for recording. In such case, most of the signal processing takes place in an 8-channel format.

In a video tape recorder (VTR), it is generally impossible to record or reproduce DC or low frequency components by means of the magnetic head used for recording and reproducing and, when such head is rotary and electrically coupled to the corresponding recording and reproducing circuits via a rotary transformer, difficulties are also encountered in transmitting the low frequency components to and from the rotary head. Furthermore, since the high frequency characteristic deteriorates as a result of the spacing loss, head gap loss and so forth in a magnetic recording operation, the recording/reproducing circuit of the VTR has a band-pass type frequency characteristic.

Therefore, in existing D-VTRs designed to perform digital signal recording and reproducing operations, various recording-modulation encoding methods are relied upon for conversion of the digital signals into a form substantially suited for the characteristics of the magnetic recording circuit. In accordance with one such recording-modulation encoding method, m-bit data representing one sampled or picture element (pixel) is converted into n-bit recording data, and a series of such recording data are converted by a non-return to zero (NRZ) or similar mode for recording in that mode. One of such recording-modulation encoding methods employs an 8-10 conversion mode which converts 8-bit data into 10-bit data having a satisfactory code balance for minimizing the DC component of recorded signals. However, such 8-10 conversion undesirably increases the bits of data to be recorded, that is, redundant bits have to be recorded. In order to avoid that disadvantage, an 8—8 conversion mode has been employed which rearranges the 8-bit video data without increasing the bit number thereof by utilizing the close correlation between adjacent samples of the video signals. Although low-frequency components of the recording signals are reduced without increasing the number of bits of the recorded data, the 8—8 conversion mode is limited in its ability to eliminate the low-frequency components of the recording signals.

Furthermore, in existing D-VTR recording/reproducing techniques, an error correction code of a product code pattern is added to the digital data to be transmitted, with the intention that any data error, such as is caused by data dropout or the like, is detected and corrected or concealed by the receiving or reproducing unit.

In the earlier described known D-VTR in which each image frame composed of HDTV video signals is divided into N horizontally contiguous segments to reduce the video data processing speed to 1/N, the video data of the divided frame segments are distributed into respective channels for parallel processing. In other words, the video data of each of the frame segments is distributed to a corresponding individual channel. Consequently, if any fault or increase of the error rate occurs in one channel, it becomes necessary to frequently execute error correction of the error rate in such channel. Moreover, if the video data of a channel is not reproducible at all, error correction becomes impossible and eventually the divided frame segment corresponding to that channel cannot be reproduced.

Further, it has been proposed, for example, as disclosed in an article entitled "Study of Multi-channel Distribution for High Definition Digital V-TR" by Shinichi Mayazaki, Yoshizumi Etoh and Masuo Umemoto, appearing at pages 229-230, of the 1985-Proceedings of the Institute of Television Engineers of Japan, to adopt run length limitation 8—8 conversion and to use two pixels as the unit of distribution of the luminance and chrominance signals which are sequentially circulated in each of a number of channels. The channel receiving the signals is shifted to a different channel at every horizontal period so that the data distributed into any one of the channels does not correspond to vertically aligned pixels of the reproduced picture. The foregoing has the advantage of permitting the use of vertically adjacent data for concealment of continuous errors in a channel due to drop out or the like. However, the described multi-channel distribution for a high definition digital VTR, does not substantially eliminate low frequency components of the recording signals by its use of the run length limitation 8—8 conversion. Further, since the high speed digital video data signals are not spatially divided into a number of horizontally contiguous segments of the video picture, the described multi-channel distribution does not adequately reduce the data bit rate for processing in each channel.

The above problems are substantially alleviated in the digital video transmission system disclosed in U.S. patent application Ser. No. 07/283,844, filed Dec. 13, 1988 and having a common assignee herewith. In this system, high speed digital video data signals including digital luminance data signals and first and second digital chrominance data signals are transmitted. The high speed digital video data signals are spatially divided into a number of horizontally contiguous samples of the video picture and then correspondingly time-expanded. The luminance and first and second chrominance signals of each of the segments is divided into respective sets each consisting of two successive digital signals. Then the sets of signals are distributed into a plurality of transmission channels such that each set of digital luminance data signals is interleaved between sets of the first and second digital chrominance data signals, respectively, in each of the transmission channels. One of the two successive data signals in each set is inverted to obtain the complement thereof, which, due to the high correlation between the two signals in each set, minimizes low frequency and DC components in each channel. The transmitted signals are suitable for signal processing to conceal data errors even where increased error rates are encountered or in the event of the failure of a given transmission channel. At the same time, by time expanding the data signals the data bit rate for processing in each channel is advantageously reduced.

Existing analog type helical scan video tape recorders provide the capability of recording and reproducing time code signals useful for editing recorded materials. These time code signals are inserted in the vertical blanking period and are, accordingly, referred to as vertical interval time code signals (VITC). The VITC is typically provided in a digital format having 64 data bits divided into 8 groups of 8 bits apiece and each having synchronization bits added thereto, together with an 8-bit CRC code and synchronization bits, providing a total of 90 bits of data. This signal is inserted in each of two non-adjacent horizontal lines of the blanking period of each field.

In analog type video tape recorders, proper reproduction of the VITC signal is not possible in the slow play mode. While this disadvantage is advantageously overcome with the use of the digital video signal transmission system of U.S. patent application Ser. No. 07/283,844 further identified above, it is not possible to suppress low-frequency components of the VITC signal by means of the 8—8 conversion technique described therein since, unlike video image data, the VITC signal does not possess any degree of correlation between adjacent data bytes.

OBJECTS AND SUMMARY OF THE INVENTION

Accordingly, it is an object of this invention to provide improved transmission of digital video data signals which is particularly suited for use in digitally recording and reproducing high-definition television video signals, and which avoids the above mentioned disadvantages and problems associated with the prior art.

More specifically, it is an object of this invention to provide improved transmission of digital video data signals, including time code signals, which are distributed among a plurality of channels for parallel processing at relatively low data rates, and wherein the data distribution makes possible proper error correction for achieving satisfactory signal reproduction even when a fault or increased error rate occurs in one of the channels.

Another object of the invention is to provide improved transmission of high speed digital video image data together with digital time code data, such that the image data signals experience differing time delays in signal processing as compared to the time code signals, and wherein time delay correction techniques are employed to provide each time code signal simultaneously with its corresponding video image data signals.

It is a further object of this invention to substantially reduce the low frequency components of the transmitted digital video time code signals, for example, so as to facilitate the accurate magnetic tape recording thereof.

In accordance with an aspect of this invention, in transmitting frames of digital video data signals comprised of digital luminance data signals and first and second digital chrominance data signals, such as, R-Y and B-Y signals, together with time code data signals representing frames of data; the digital luminance data signals are divided into sets thereof each consisting of two successive digital luminance data signals, the first and second digital chrominance data signals are similarly divided into respective sets thereof each consisting of two successive first and second digital chrominance data signals, respectively, and the time code data signals are divided into sets thereof each consisting of two identical time code data signals whereupon the sets of digital luminance data signals, first and second digital chrominance data signals and time code data signals are distributed into a plurality of transmission channels in such a manner that each set of digital luminance data signals is interleaved between sets of the first and second digital chrominance data signals, respectively, while each set of time code signals is distributed into all of the transmission channels, with one of the two successive data signals in each of the sets of digital luminance data signals, first and second digital chrominance data signals and time code data signals being inverted for obtaining the complement of the one of the two successive data signals in each set which has been inverted and thereby substantially minimizing any low frequency or DC component in each of the transmission channels.

In accordance with another aspect of this invention, the time code data signals from a plurality of the transmission channels are processed to detect data transmission errors and the validity of the time code data signals is determined based on the presence of a plurality of time code data signals which are free of errors. In a particularly advantageous embodiment of the invention, the validity of the time code data signals is determined based on the presence of at least three of such signals which are free of errors.

In accordance with another feature of this invention, the digital luminance data signals and the first and second digital chrominance data signals are included within a frame of a video image transmitted at a time different from that at which time code data signals representing the same frame of the video image are transmitted. The digital luminance data signals and the first and second digital chrominance data signals are time shifted with respect to the time code data signals so that the digital luminance data signals and the first and second digital chrominance data signals are provided simultaneously with the time code data signals which represent the same frame of the video image.

The above, and other objects, features and advantages of the invention will be apparent in the following detailed description of an illustrative embodiment thereof which is to be read in connection with the accompanying drawings forming a part hereof, and wherein corresponding parts and components are identified by the same reference numerals in the several views of the drawings.

BRIEF DESCRIPTION OF THE DRAWINGS

FIG. 4 is a table to which reference will be made in explaining the operation of a so-called barrel shifter included in the channel encoder of FIG. 3, and which shows the connections established between various inputs and outputs of the barrel shifter in response to various different control data applied to the barrel shifter;

FIG. 5 is a table showing the luminance data signals and chrominance data signals applied to various inputs of the barrel shifter, and to which reference will be made in explaining the operation of the channel encoder;

FIGS. 6A and 6B are tables respectively showing the outputs of the barrel shifter and a subsequent delay circuit for various control data applied to the barrel shifter, and to which reference will be made in explaining the operation of the channel encoder;

FIGS. 7A, 7B, 7C and 7D diagrammatically show the arrangements of video data in a horizontal line of the four segments, respectively, into which each frame of the video picture is divided in the recording unit of FIG. 1, with the chrominance data having been thinned out;

FIG. 8 is a table showing how video data at individual sampling points are distributed into eight parallel data;

FIG. 9 is a table showing how the eight parallel data in successive horizontal lines are distributed among eight transmission channels;

FIG. 10 is a table showing the transmission channels receiving the video data corresponding to the sampled points in successive horizontal lines of the video picture;

FIG. 13A and 13B respectively illustrate the complementary tables of two read only memories (ROMs) included in the circuit of FIG. 12;

FIG. 14A illustrates examples of digital video data applied in succession to one of the data processing circuits in the recording unit of FIG. 1;

FIG. 14B illustrates, by way of example, the results of 8—8 conversion of the digital video data shown on FIG. 14A;

FIG. 14C illustrates the digital video data of FIG. 14A following its 8—8 conversion and selective inverting, that is, the digital video data at the output of the respective data processing circuit;

FIG. 18 is a table illustrating how the transformed VITC signals are stored in memory for recording;

FIG. 19 is a table showing how the transformed VITC signals are applied to various inputs of the barrel shifter of FIG. 1;

FIG. 20 is a table showing the outputs of the barrel shifter and a subsequent delay circuit for various control data applied to the barrel shifter as the VITC signals are input thereto as shown in FIG. 19;

FIG. 21 is a block diagram illustrating a reproducing unit of the D-VT in which digital video data is transmitted in accordance with an embodiment of the invention.

DETAILED DESCRIPTION OF THE PREFERRED EMBODIMENT

Figure 1:
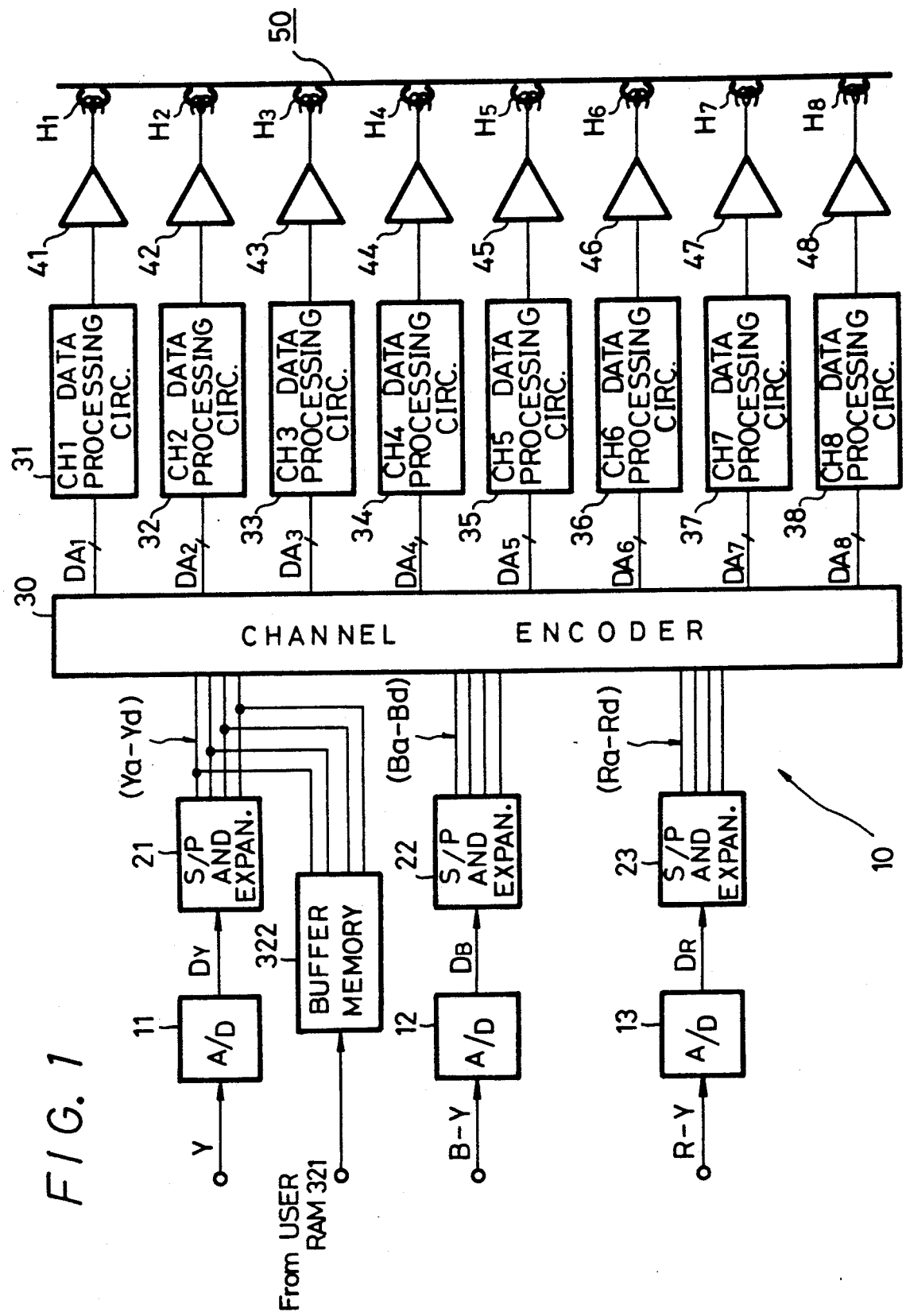
FIG. 1 is a block diagram showing a recording unit in a high-definition tYpe D-VTR in accordance with an embodiment of the present invention.
Figure 2:
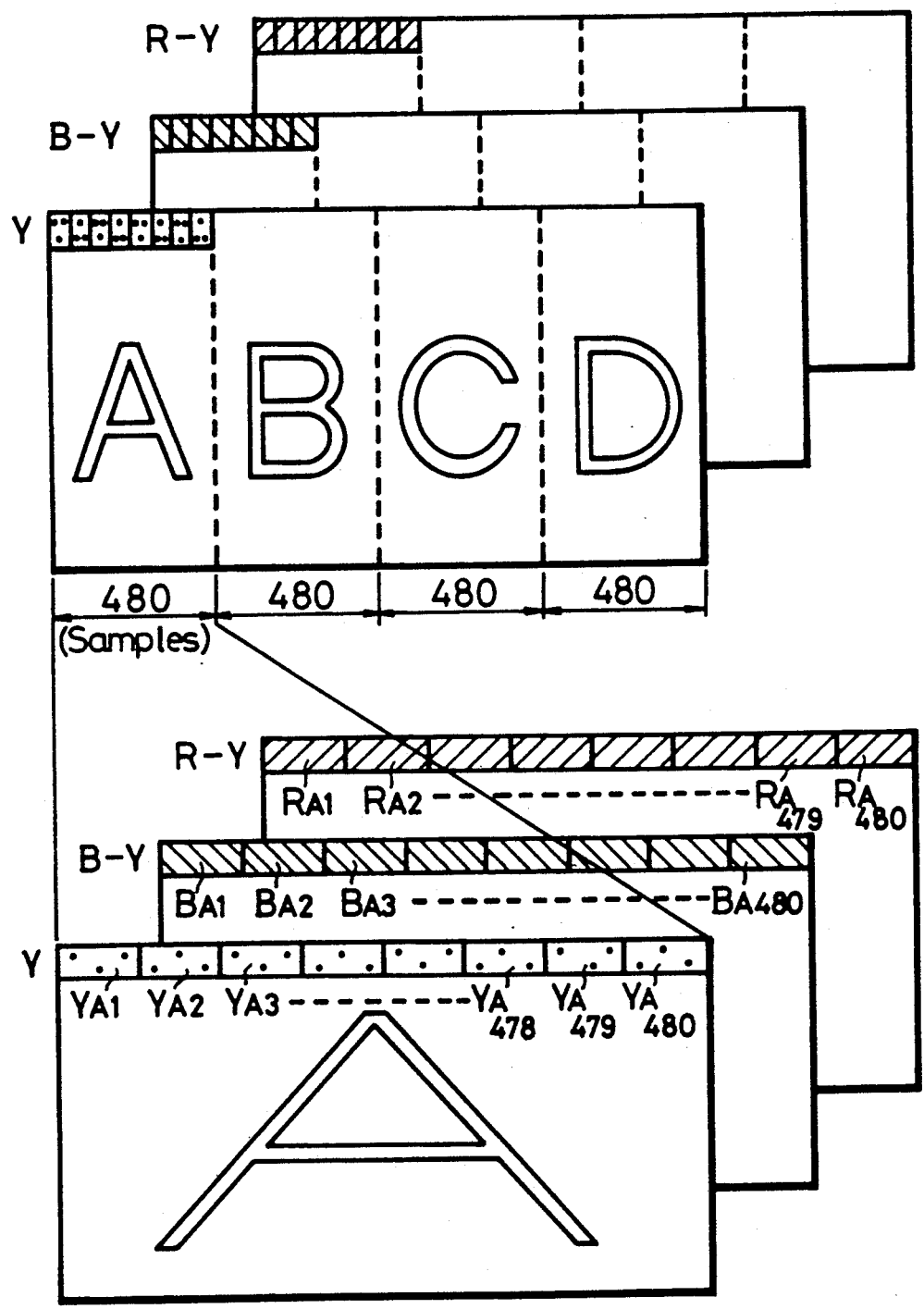
FIG. 2 schematically illustrates how the luminance and chrominance signals constituting one frame of a color video signal are divided in correspondence with horizontally contiguous segments of the respective video picture in the recording unit of FIG. 1.

Referring to the drawings in detail, and initially to FIG. 1 thereof, it will be seen that, in a D-VTR in accordance with an embodiment of the present invention for digitally recording and reproducing video signals of a high-definition television (HDTV) system, the recording unit 10 includes analog-to-digital (A/D) converters 11, 12 and 13 which individually digitize the input luminance signal Y and the input first and second component chrominance signals B-Y and R-Y, respectively, of the HDTV video data signals. The resulting luminance signal data DY and chrominance signal data DB and DR obtained from the A/D converters 11, 12 and 13 respectively, are supplied to serial-to-parallel (S/P) converters 21, 22 and 23, respectively. The S/P converter 21 converts the luminance signal data DY into four parallel digital luminance data signals Ya, Yb, Yc, and Yd (FIG. 3) which respectively correspond to four horizontally contiguous frame segments A, B, C and D shown on FIG. 2 to be obtained by dividing a frame of the video picture along vertical lines. Similarly, the S/P converters 22 and 23 convert the digital chrominance data signals DB and DR, into four parallel digital chrominance data signals Ba, Bb, Bc and Bd, and Ra, Rb, Rc and Rd, respectively, which again respectively correspond to the segments A, B, C and D of a frame of the video picture.

The digital video data signals for each frame of the video picture or image are comprised of 1920 samples per horizontal line of the luminance signal data DY, and 1920 samples per horizontal line of each of the chrominance signal data DB and DR. Accordingly, in the case where the video signals constituting a horizontal line are divided into four parallel video data corresponding to the four divided segments A, B, C and D, the luminance signal data DY for each segment of a line are composed of 480 samples and, similarly, the chrominance signal data DB and DR for each segment of a divided line are each composed of 480 samples. Further, in the converters 21, 22 and 23, the four parallel video data Ya-Yd, Ba-Bd and Ra-Rd, respectively, are time-expanded, as indicated on FIG. 2, so that the 480 samples of the luminance signal and of each of the chrominance signals making up each of the segments A, B, C and D of each horizontal line will have the same duration as a horizontal line of a full frame of the video picture.

Figure 3:
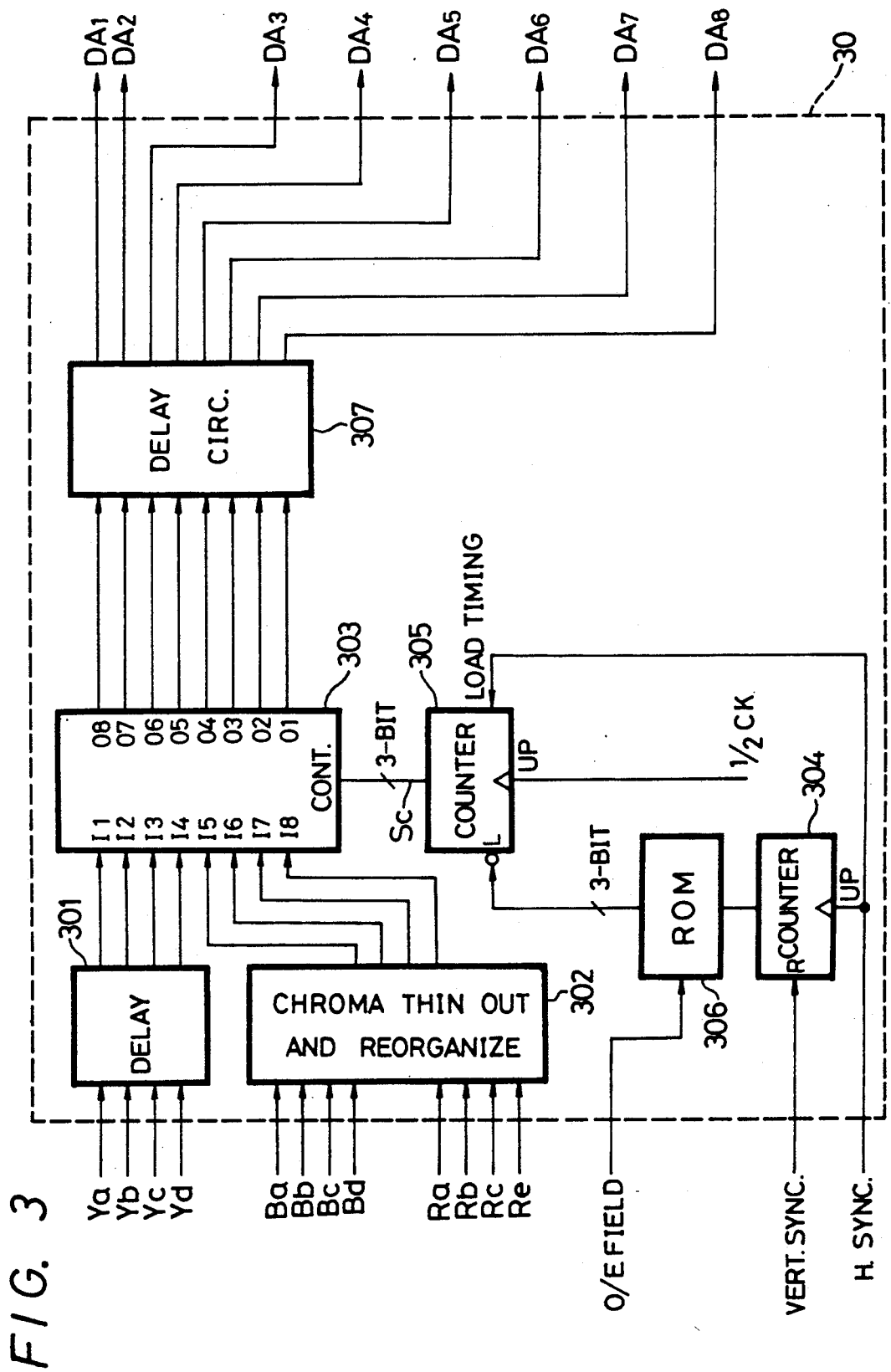
FIG. 3 is a block diagram showing, in greater detail, a channel encoder that is included in the recording unit of FIG. 1.

The parallel video data from the S/P converters 21, 22 and 23 are supplied to a channel encoder 30 which, as shown on FIG. 3, includes a delay circuit 301 receiving the parallel data Ya, Yb, Yc and Yd, and a chroma thinning out and reorganizing circuit 302 which receives the parallel data Ba, Bb, Bc and Bd and the parallel data Ra, Rb, Rc and Rd.

As shown on FIGS. 7A-7D, the digital chrominance data signals Ba-Bd and Ra-Rd applied to the circuit 302 are thinned-out in the latter, for example, by sub-sampling or by dropping every other sample of the parallel data, whereupon the thinned-out or remaining samples of the chrominance data Ba-Bd and Ra-Rd are respectively mixed with each other, as shown on FIG. 5, and applied to inputs I5, I6, I7 and I8 of a so-called barrel shifter 303. Simultaneously, the parallel luminance data Ya, Yb, Yc and Yd, after having been delayed for two sampling periods in the delay circuit 301, are respectively applied to inputs I1, I2, I3 and I4 of the barrel shifter 303, as also indicated on FIG. 5.

As shown, the barrel shifter 303 has eight output terminals 01, 02, 03, - - - 08 which are each selectively connectable to each of the inputs I1, I2, I3 - - - I8, for example, through suitable switching circuits (not shown), in response to 3-bit data applied to a control terminal of the barrel shifter 303 and representing a control signal $S_c$ which selectively has a counted value from "0" to "7". As shown on FIG. 4, when the 3-bit control data represents the value "0" of the control signal $S_c$, the output terminals 01, 02, 03, - - - 08 of the barrel shifter 303 are connected to the inputs I1, I2, I3, - - - I8, respectively. Similarly, when the control signal $S_c$ has the value "1", the outputs 01, 02, 03, - - - 08 of the barrel shifter 303 are connected to the inputs I8, I1, I2, - - - I7, respectively.

For providing the 3-bit data constituting the control signal $S_c$ for the barrel shifter 303, the channel encoder 30 is further shown on FIG. 3 to include a counter 304 having a reset input R to which a vertical synchronizing signal separated from the video signal being recorded is applied as a reset pulse. A horizontal line pulse or synchronizing signal, also separated from the video signal being recorded, is supplied to a clock input of the counter 304 so as to be counted up by the latter. The horizontal synchronizing signal is also supplied, as a load timing pulse, to a counter 305 which counts up a clock ½ CK having a frequency which is ½ that of the sampling pulse employed in the A/D converters 11, 12 and 13. The count or output from the counter 305 is the 3-bit data representing the control signal $S_c$. A read only memory (ROM) 306 receives the counted output of the counter 304 and an odd/even field pulse and, in response to each such field-pulse the ROM 306 supplies 3-bit initial data corresponding to the counted value from the counter 304 and which is applied to a load input L of the counter 305. This initial 3-bit data applied as load data to the counter 305 determines which data, among the data DATA 1-DATA 8 (FIG. 8) are supplied from the channel encoder 30 to each of eight transmitting channels CH1, CH2, CH3, - - - CH8, respectively.

Since the counter 305 counts the clock ½ CK having a frequency which is ½ the sampling frequency, it will be apparent that the 3-bit control data supplied as control signal $S_c$ from the counter 305 to the barrel shifter 303 changes only every two samples. Accordingly, and as shown on FIG. 6A, the digital luminance data signals Ya-Yd and the first and second digital chrominance data signals Ba-Bd and Ra-Rd of the time-expanded picture segments are divided, by the barrel shifter 303 into respective sets thereof which each consist of two successive data signals. For example, at the output 01 of the barrel shifter 303, as the control signal $S_c$ changes its value every two samples, the resulting output consists of successive sets of digital luminance data signals, as at Ya1, Ya2, and of the first and second digital chrominance data signals, as at Ba1, Ba3 and Rb1, Rb3. As shown on FIG. 3, the outputs 01, 02, 03, - --- 08 of the barrel shifter 303 are connected to a delay circuit 307 in which the outputs 01, 03, 05, 07 are delayed by two sampling periods relative to the outputs 02, 04, 06 and 08 for aligning the heads of the eight parallel streams DA1, DA2, DA3, - - - DA8 of video data on FIGS. 1, 3 and 6B.

It will be appreciated from the foregoing that the channel encoder 30 provides eight parallel streams DA1, DA2, DA3, - - - DA8 of video data DATA 1, DATA 2, DATA 3, - - - DATA 8 (FIG. 8) of a predetermined data array by rearranging the luminance signal data DY and chrominance signal data DB and D received from the A/D converters 11, 12 and 13, respectively, by way of the S/P converters 21, 22 and 23, and then distributes such eight parallel streams DA1, DA2, DA3, - - - DA8 of video data DATA 1, DATA 2, DATA 3 - - - DATA 8 into first through eighth channels CH1, CH2, CH3, - - - CH8, respectively, in a predetermined sequence. As shown on FIG. 1, the eight parallel streams of video data DATA 1, DATA 2, DATA 3, - - - DATA 8 thus distributed into the channels CH1, CH2, CH3, - - - CH8 are supplied from data processing circuits 31, 32, 33, - - - 38, respectively, through recording amplifiers 41, 42, 43, - - - 48, respectively, to eight magnetic heads H1, H2, H3, - - - H8, respectively, which are operative to record the received data in 8-channel tracks which desirably extend obliquely on a magnetic tape 50.

In the channel encoder 30, the luminance signal data DY and the chrominance signal data DB and DR converted by the S/P converters 21, 22 and 23 into four parallel streams of data corresponding to the four divided frame segments A, B, C and D are further processed so as to be arranged in sets each comprising two successive samples of the corresponding signal data and arrayed to form the eight parallel streams of data DATA 1, DATA 2, DATA 3, - - - DATA 8, as shown in FIG. 8. It will be seen that, in the arrangement of FIG. 8, each set of two successive samples of the luminance signal data, for example, as indicated at Yb7, Yb8 in DATA 1, is interleaved between sets of two samples of the chrominance signal data DB and DR, for example, as indicated at Ba5, Ba7 and at Rb5, Rb7, respectively. In other words, in each of the eight parallel streams of video data, each set comprised of two samples of the luminance signal data DY is interposed between two sets of the chrominance signal data DB and the chrominance signal data DR, respectively.

As a result of the described operation of the channel encoder 30, the four parallel video data Ya-Yd, Ba-Bd and Ra-Rd provided by the S/P converters 21, 22 and 23 in correspondence with the four divided frame segments A, B, C and D are rearranged or distributed throughout the eight parallel streams of data DATA 1, DATA 2, DATA 3, - - - DATA 8 which are each composed of sets of two successive samples, as shown on FIG. 8. Furthermore, as shown on FIG. 9, the distribution of the eight parallel streams of data to the individual channels CH1, CH2, CH3, - - - CH8 is changed in a predetermined 8-line sequence so that the data at the same horizontal positions on vertically adjacent horizontal lines of the frame or video picture are distributed to different channels.

Referring now to FIG. 10, which illustrates the channels in which the video data representing the divided frame segment A are distributed, it will be seen that, when the luminance signal data and the chrominance signal data converted into four parallel data corresponding to the divided frame segments A, B, C and D, as described above, are distributed into the several channels CH1-CH8 by the channel encoder 30 in a manner to obtain the data arrangements shown in FIGS. 8 and 9, sets of the digital luminance data signals Ya-Yd, sets of the first digital chrominance data signals Ba-Bd and sets of the second digital chrominance data signals Ra-Rd corresponding to pixels positioned contiguous to each other in adjacent horizontal lines are respectively distributed into different transmission channels. Thus, for example, the data corresponding to the pixels 9 and 10 in line 5 are shown on FIG. 10 to be distributed in channel CH2, whereas the data corresponding to the contiguous pixels 8, 9, 10 and 11 in lines 4 and 6 and the pixels 8 and 11 in line 5 are distributed into the other seven channels, that is, into the channels CH1, and CH3-CH8. By reason of the foregoing, errors occurring in transmission in any channel can be readily corrected and/or concealed on the basis of data transmitted in the other channels.

Figure 11:
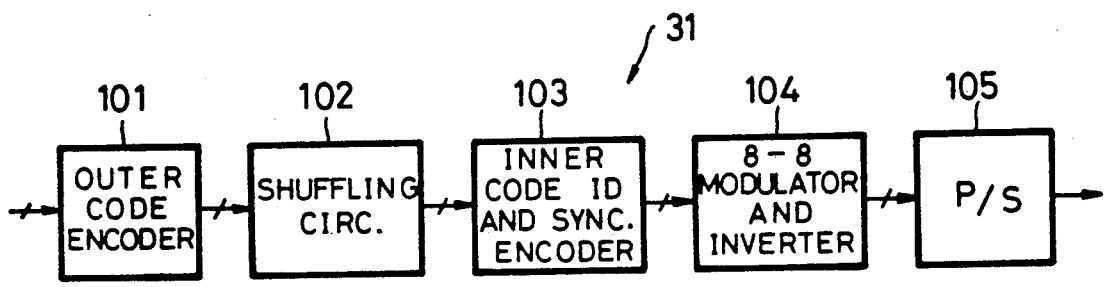
FIG. 11 is a block diagram showing components making up a data processing circuit in each of the transmission channels of the recording unit of FIG. 1.

Referring now to FIG. 11 which, by way of example, shows the data processing circuit 31 in the channel CH1, it will be noted that each of the data processing circuits 31, 32, 33 - - - 38 interposed in the channels CH1, CH2, CH3, - - - CH8, respectively, comprises an outer code encoder 101 which receives the video data D1 transmitted through the channel CH1, and which adds thereto, as an error correction code, a first-direction outer code added to each row of 2-dimensional data formed by 2-dimensionally arraying a predetermined number of the video data in the data stream D1 supplied to the respective first channel CH1. A shuffling circuit 102 conventionally shuffles the 2-dimensional data after the addition thereto of the outer code by the encoder 101 and, thereafter, an encoder 103 adds to the 2-dimensional data from the circuit 102, a second-direction inner code acting as an error correction code. Further, the encoder 103 adds a sync word and a block identification code ID. The next component 104 of the data processing circuit 31 is generally operative to effect 8—8 conversion so as to perform a recording-modulation encoding operation in respect to the 2-dimensional data after the addition thereto of the second-direction inner code, the sync word and the block identification code ID by the encoder 103. Further, as will be hereinafter described in detail, the circuit 104 is effective to invert one of the two successive data signals and in each of the sets of first and second digital chrominance data signals so as to achieve a desirable code balance within each set of two samples or data signals, even when such code balance is not adequately achieved by means of 8—8 conversion.

Figure 12:
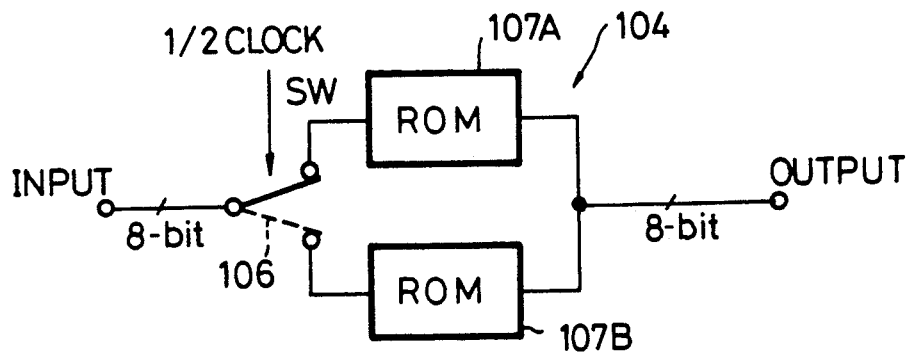
FIG. 12 is a block diagram of a circuit that may be employed for effecting 8—8 conversion and selective inverting of the video data in each of the data processing circuits typified by FIG. 11.

More specifically, and as shown on FIG. 12, the circuit 104 may desirably include two ROMs 107A and 107B to which 8-bit video data are selectively input as address data through a switch 106 from the output of the encoder 103. As shown on FIGS. 13A and 13B, the ROM's 107A and 107B have complementary tables and, upon being addressed by 8-bit video data, output 8—8 converted video data. The switch 106 is operated by a switch control signal $S_W$ having a frequency equal to ½ the sampling clock frequency so that the switch 106 is in the position shown in full lines to supply the 8-bit input as an address to the ROM 107B, during the first sample of each set, and to dispose the switch 106 in the position shown in broken lines on FIG. 12 for supplying the 8-bit input as an address to the ROM 107B during the second sample of the same set. The outputs of the ROMs 107A and 107B are connected together for alternately providing the output of the circuit 104.

The operation of the circuit 104 in achieving a desirable code balance within each set of two samples or data signals, even when such code balance is not adequately achieved by means of the 8—8 conversion, will now be described with reference to FIGS. 14A, 14B and 14C. By way of example, FIG. 14A shows the first three sets of DATA 1 supplied to the first channel CH1 during the first line of a frame, and which are shown on FIG. 8 to be comprised of the set luminance data signals Ya3, Ya4, the set of chrominance data signals Ba5, Ba7, and the set of luminance data signals Yb7, Yb8. For the sake of this explanation, any influence of the outer and inner codes added in the encoders 101 and 103 is disregarded.

The luminance data signals Ya3, Ya4, which are distributed as a set, are assumed to have values represented by the 8-bit digital signals 00100001 and 00100010, respectively, while the chrominance video signals Ba5, Ba7 which are also distributed as a set, are assumed to have values corresponding to the 8-bit signals 10000000 and 10000001, and the luminance data signals Yb7, Yb8 are assumed to be represented by the 8-bit digital signals 10101011 and 10100111, respectively, as shown on FIG. 14A.

It is desired that the codes be balanced in each set of 16-bits of digital data so as to equalize the numbers of bits that are "1" and "0". It will be seen that, in the case of the 16-bit digital data representing the set of luminance data signals Ya3, Ya4, the ratio of "1" bits to "0" bits is 4:12, in the case of the 16-bit data representing the chrominance data signals Ba5, Ba7, the ratio of "1" bits to "0" bits is 3:13, and, in the case of the 16-bit data representing the luminance data signals Yb7, Yb8, the ratio of "1" bits to "0" bits is 10:6.

Although the code balance is shown to be improved in respect to the 16-bit data representing the chrominance data signals Ba5, Ba7 as a result of the 8—8 conversion thereof, that is, the 16-bit data obtained by the 8—8 conversion contains 8 "1" bits and 8 "0" bits (FIG. 14B), corresponding improvement in the code balance is not obtained in respect to the 16-bits representing the luminance data signals Ya3, Ya4 and 16-bit data representing the luminance data signals Yb7, Yb8. Thus, as shown in FIG. 14B, the 16-bits of data representing the data signals Ya3, Ya4 contain 4 "1" bits and 12 "0" bits even after the 8—8 conversion, and 16-bits of data representing the luminance data signals Yb7, Yb8 contains 10 "1" bits and 6 "0" bits, after the 8—8 conversion, and these ratios are not sufficiently balanced.

However, when the 8-bit data representing the second sample in each of the video data sets are inverted to produce 8-bit data which are complementary to the original data resulting from the 8—8 conversion, a satisfactory code balance is obtained in all instances. Thus, in the example illustrated by FIGS. 14A, 14B and 14C, the 8-bit data 10100000 which results from the 8—8 conversion of the 8-bit data representing the luminance data signal Ya4, are inverted to provide the 8—8 bit data 01011111 shown on FIG. 14C. This results in the 16-bit data representing the video data set Ya3, Ya4 containing 8 "1" bits and 8 "0" bits. Similarly, in the case of the video data signals Yb7, Yb8, the 8-bit data 00110111 resulting from the 8—8 conversion of the data representing the signal Yb8 are inverted to provide the 8-bit data 11001000 (FIG. 14C). As a result of the foregoing, the 16-bit data representing the luminance data signals Yb7, Yb8 after the 8—8 conversion and inverting contains 8 "1" bits and 8 "0" bits. Thus, the sets Ya3, Ya4 and Yb7, Yb8 having inadequate code balances even after the 8—8 conversion are provided with precise code balance by the inverting of the 8-bit data representing the second video data signal of each set. Furthermore, where the 8—8 conversion was effective to obtain a proper code balance, as in the case of the set Ba5, Ba7, the inverting of the 8-bit data representing the second sample of that set does not disturb the desirable code balance, as is apparent in FIG. 14C.

Referring again to FIG. 11, it will be seen that the data processing circuit 31 is completed by a parallel-to-series (P/S) converter 105 which receives the recording-modulation encoded data processed by the circuit 104 and sequentially converts each transmission block so as to produce serial data at the output of the respective channel CH1.

Figure 15:
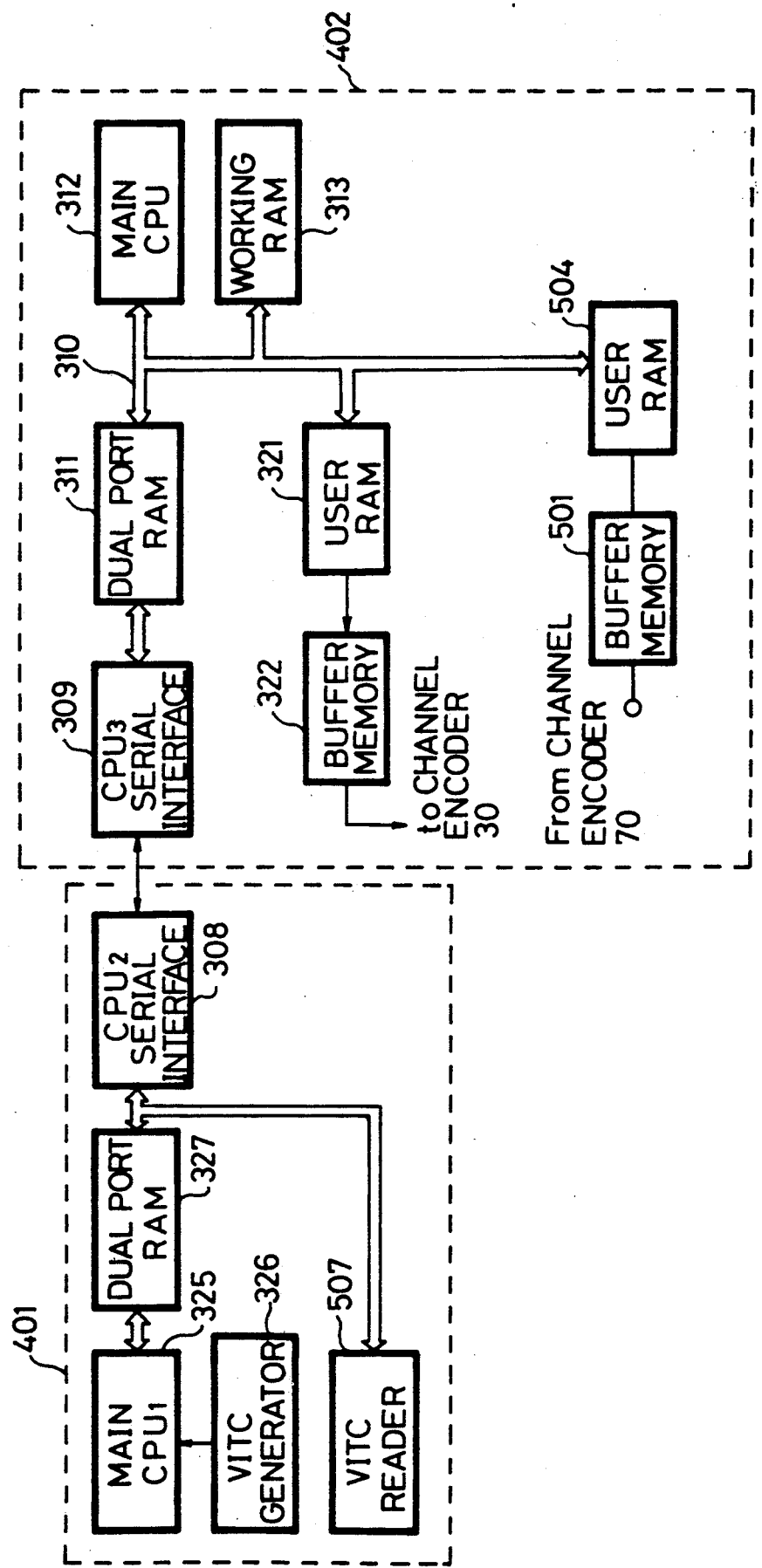
FIG. 15 is a block diagram illustrating a VITC signal generator/reader and signal processing unit in which VITC signals are transformed for transmission in accordance with an embodiment of the invention.

Referring now to FIG. 15, it will be seen that a vertical interval time code (VITC) generator/reader circuit 401 includes a VITC generator 326 which produces time code data to be recorded in the vertical blanking period of each video field. In the present embodiment of a D-VTR for digitally recording and reproducing video signals of an HDTV system, five horizontal lines of each vertical blanking period are provided for the insertion of user data, namely the 38th, 39th and 40th lines in each odd field and the 601st and 602nd lines of each even field. Each line provides the capacity to insert 1920 bytes of data. In the present embodiment, the VITC signal comprises eight bytes of data designated B0–B7, wherein B0 represents hour information, B1 represents minute information, B2 represents second information, B3 represents frame information and bytes B4–B7 are made available for the insertion of data at the user's discretion. Bytes B0–B2 reflect time information generated by an internal clock of the VITC generator 326, while byte B3 represents the video image frame data generated simultaneously therewith.

VITC generator 326 provides the 8-byte VITC signal to a main central processing unit or microcomputer 325 of the VITC generator/reader circuit 401 which is coupled to a first port of a dual port RAM 327 for storing the VITC signal therein. A second port of dual port RAM 327 is coupled to a second microcomputer and serial interface circuit 308 for providing the VITC signals stored in dual port RAM 327 to a VITC signal processing unit 402 which serves to process the VITC signals for recording by the recording unit 10 of FIG. 1.

Signal processing unit 402 includes a third microcomputer and serial interface circuit 309 coupled with microcomputer 308 to input the VITC signals from the VITC generator/reader circuit 401 and further coupled with a first port of a dual port RAM 311 for storing the input VITC signals therein pending further processing. A second port of dual port RAM 311 is coupled with a data bus 310 to which a further microcomputer or main central processing unit 312 of unit 402 and a working RAM 313 likewise are coupled. Central processing unit 312 receives the VITC signals from the dual port RAM 311 through data bus 310 and transforms the VITC signals for recording by the recording unit 10, as explained herein below.

Figures 16, 17:
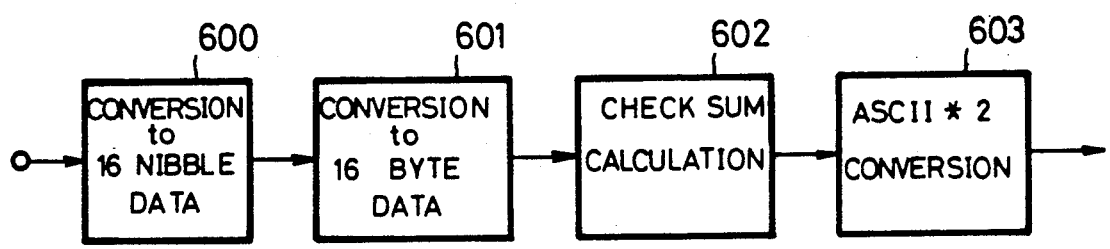
FIG. 16 illustrates a step by step procedure employed in the signal processing unit of FIG. 15 for transforming VITC signals into a recording format.
FIG. 17 is a table illustrating the conversion of VITC data from binary to ASCII×2 format in accordance with the procedure of FIG. 16.

In FIG. 16, there is illustrated a step by step procedure employed by the main central processing unit 312 for converting the VITC signal prior to the recording thereof on magnetic tape. In the initial step 600, each of the eight bytes B0–B7 of VITC data is converted into two four-bit nibbles, with the first nibble consisting of the four most significant bits of each byte and the second nibble consisting of the four least significant bits thereof. As used herein, $D_{2n}$ represents the nibble consisting of the four least significant bits of a corresponding one of the bytes B0–B7 designated $B_n$ and is the result of performing a logical AND of the byte $B_n$ with the hexadecimal number 0F. $D_{2n+1}$ represents the four-bit nibble consisting of the four least significant bits of the byte $B_n$ and is the result of dividing the byte $B_n$ by 16, that is, effectively shifting the four most significant bits of byte $B_n$ to the right four places.

Next, as represented by step 601 of FIG. 16, the main central processing unit 312 converts each of the 16 resulting nibbles $D_{2n}$, $D_{2n+1}$, or $D_0$ to $D_{15}$, into eight bit words, or bytes, D0 to D15, Wherein the four least significant bits thereof are equal in value to the four bits of the corresponding nibble $D_{2n}$ to $D_{2n+1}$, respectively, and the most significant bits thereof are each equal to 0.

In step 602, the main central processing unit 312 utilizes the resulting 16 bytes of data D0-D15 to calculate two additional bytes of check sum data which are transmitted with bYtes D0-D15 to provide a means for detecting the presence of transmission errors. In accordance with step 602, a first check sum code byte $D_s$ is calculated as follows:

$$D_s = \text{OFFh AND } (R0\ D0 + R1\ D1 + R2\ D2 + R3\ D3 +$$
$$R4\ D4 + R5\ D5 + R6\ D6 + R7\ D7 + R0\ D8 + R1\ D9 +$$
$$R2\ D10 + R3\ D11 + R4\ D12 + R5\ D13 + R6\ D14 + R7\ D15)$$
$$\text{where } Rn\ D = \text{OFFh AND } (2^n \cdot D) + 2^n \cdot D \div 2^8.$$

The function Rn D effectively rotates each of the bytes D0-D15 n places to the left, that is, it forms the sum of the 8−n least significant bits thereof shifted n spaces to the left with the n most significant bits thereof shifted 8−n spaces to the right, and effectively "rotates" each byte D to the left by n places. The sum of the terms Rn D may exceed an 8-bit word and, accordingly, it is ANDed with OFFh in order to limit Ds to 1 byte in length.

Thereafter Ds is converted into 2 bytes $D_{s0}$ and $D_{s1}$ in the same manner that bytes B0-B7 were each converted into respective pairs of bytes D0-D15. That is, $D_{s0}$ is 1 byte in length and consists of four least significant bits equal in value to the four least significant bits of Ds and four most significant bits each equal to 0, while Ds1 is an 8-bit word whose four least significant bits are equal to the four most significant bits of Ds and whose four most significant bits are each equal to 0. In this manner, a total of 18 bytes of data are obtained, that is, bytes D0-D15 and bytes $D_{s0}$-$D_{s1}$.

In step 603 each of these 18 bytes of data is transformed into ASCII format×2, that is, the corresponding ASCII format shifted left one digit so that the least significant bit of each byte equals 0. FIG. 17 illustrates the conversion of the data D0-D15, $D_{s0}$-$D_{s1}$ from binary format to ASCII×2. The left hand column of FIG. 17 lists the values that the four least significant bits of each byte D0-D15, $D_{s0}$-$D_{s1}$ can assume, while it is noted that the four most significant bits thereof are always zero. The right hand column lists the corresponding ASCII×2 converted format for each listed binary value in the left hand column. Since the least significant bit or digit of each byte, when in ASCII×2 format, carries no information at this point, it may be utilized subsequently as an error flag to enable the detection and correction of transmission errors. In addition, by converting each byte into ASCII code it is prevented from assuming a value of FFh or 00h which are read as inhibit codes by the D-VTR.

Upon the completion of step 603, each of the bytes D0-D15, $D_{s0}$ and $D_{s1}$ in ASCII×2 format is stored under the control of the main central processing unit 312 in a user RAM 321 coupled to receive this data over the bus 310. With reference to FIG. 18, it will be noted that each of the bytes of time code data D0-D15, $D_{s0}$ and $D_{s1}$ is stored sixteen times in sequential data addresses in user RAM 321. For example, byte D0 is stored in each of addresses A0-A15, while byte $D_{s1}$ is stored at each of addresses A272-A287.

With reference also to FIG. 1, it will be seen that the user RAM 321 has an output coupled to a buffer memory 322 for transferring the VITC signals thereto. Buffer memory 322 is comprised of a line memory or the like suitable for storing picture images and adapted to store data relatively slowly and read or output data relatively quickly on a first-in-first-out (FIFO) basis. The VITC data stored at addresses A0-A287 of user RAM 321 are output sequentially to the buffer memory 322 for storage therein.

Referring again to FIG. 1, the output of buffer memory 322 is shown to be connected to each of the four outputs of the serial-to-parallel converter 21. Buffer memory 322 functions as a serial to parallel converter operative to provide four identical bytes of each of bytes D0 through $D_{s1}$ at each of its four outputs. Accordingly, sixteen identical data words D0 are first output by buffer memory 322, four from each of the four outputs. Then sixteen identical data words D1 are output by buffer memory 322 in the same fashion, followed sequentially by the remaining words D2-$D_{s1}$ until all of the sixteen identical data words of each of D0 through $D_{s1}$ have been output by buffer memory 322 in this fashion. With reference also to FIG. 19, it will be seen that, when buffer memory 322 outputs the data stored therein sequentially, each of the bytes D0-$D_{s1}$ is applied 4 times in sequence through the delay circuit 301 (FIG. 3) to each of the barrel shifter inputs I1, I2, I3 and I4. From the foregoing discussion of the operation of channel encoder 30 in connection with FIGS. 1-10, it will be seen that the VITC signals D0 through $D_{s1}$ are provided simultaneously during the vertical blanking interval to the channel encoder 30 in place of the luminance data Ya-Yd. Buffer memory 322 operates to read out the VITC signals at the same rate that the luminance data signals Ya-Yd are provided at the outputs of serial to parallel converter 21. FIG. 20 illustrates the output of the delay circuit 307 which is provided as a result of the input of VITC data to the barrel shifter 303 as illustrated in FIG. 19.

It will be appreciated from the foregoing that the channel encoder 30 provides 8 parallel streams DA1, DA2, DA3, - - - DA8 of VITC signal data in a predetermined data array comprising sequential pairs of identical VITC signals each distributed simultaneously into eight parallel data streams DA1, DA2, DA3, - - - DA8 into first through eighth channels CH1, CH2, CH3, - - - CH8, respectively. With reference again to FIG. 1, the 8 parallel streams of VITC data thus distributed into the channels CH1, CH2, CH3, - - - CH8, after processing by corresponding circuits 31, 32, 33 - - - 38, are supplied through the recording amplifiers 41-48 respectively, to the 8 magnetic heads H1-H8, respectively, to record the VITC data during the vertical blanking interval in the 8-channel tracks extending on magnetic tape 50.

In accordance with an alternative method of transmitting VITC signals in accordance with the present invention, the time code data D0-D15, $D_{s0}$ and $D_{s1}$ stored at sequential addresses A0-A287 of user RAM 321 are output to buffer memory 322 which stores these 288 bytes of data sequentially in the same order. However, in accordance with the alternative method of transmission, the buffer memory 322 outputs the time code data D0 through $D_{s1}$ to a single data output coupled with the input of channel encoder 30 which receives the luminance signal data Ya from the serial-to-parallel converter 21 such that the 288 words of stored time code data D0 through $D_{s1}$ are output sequentially thereto. Accordingly, each of the sixteen identical bytes D0 are output sequentially to the channel encoder 30 in line positions corresponding to those of the luminance signal data Ya1 to Ya16. Thereafter, each of the identical bytes D1 are output sequentially in line positions corresponding to Ya17 to Ya32, and so on, until all 288 words of data D0 through $D_{s1}$ have been transmitted. With reference to FIG. 8, it will be seen that, where sixteen identical time code data words D0 are transmitted in line positions corresponding to those of Ya1 to Ya16, the data words D0 are distributed in pairs of identical data words into all eight parallel data streams DA1, DA2, DA3, - - - DA8 to be distributed into the channels CH1, CH2, CH3, - - - CH8 and recorded in the 8-channel tracks extending on magnetic tape 50. It will be appreciated that, because of the periodic operation of the barrel shifter 303, each of the data words D1 through $D_{s1}$ likewise will each be recorded in the 8-channel tracks of magnetic tape 50.

As previously described in the case of the luminance and chrominance video data signals, the data processing circuits 31, 32, 33 - - - 38 serve to effect 8—8 conversion of the VITC data signals and to invert one of each pair of successive, identical VITC signal bytes, thereby maintaining precise code balance and substantially minimizing any DC component in each of the channels.

Referring now to FIG. 21, it will be seen that a reproducing unit 60 of the D-VTR embodying this invention comprises 8 magnetic heads H1, H2, H3, - - - H8 adapted to scan the 8-channel recording tracks on the magnetic tape 50 for reproducing the 8-channel data recorded therein, and for supplying the reproduced data through respective reproducing amplifiers 51, 52, 53, - - - 58 to data processing circuits 61, 62, 63, - - - 68 which are interposed in first through eighth channels CH1, CH2, CH3, - - - CH8, respectively. The data processing circuits 61, 62, 63, - - - 68 are arranged to process the respective data correspondingly to the previously described data processing circuits 31, 32, 33, - - - 38 of the recording unit 10. Thus, the 8-channel video data DA1, DA2, DA3, - - - DA8 are obtained from the reproduced data by the data processing circuits 61, 62, 63, - - - 68 and supplied to a channel decoder 70. The channel decoder 70 decodes the 8-channel video data DA1, DA2, DA3, - - - DA8 in a manner corresponding to the encoding operation of the channel encoder 30 in the recording unit, and thereby provides the luminance data signal DY and the chrominance data signals DB, DR from the video data DA1, DA2, DA3, - - - DA8 and, during the vertical blanking interval likewise provides the VITC signals therefrom.

In the case of the luminance data signal DY and the chrominance signal data signals DB, DR thus obtained from the channel decoder 70, these are processed by error concealing circuits 71, 72 and 73, respectively, and then supplied through parallel-to-serial (P/S) converters 81, 82 and 83, respectively, to digital-to-analog (D/A) converters 91, 92 and 93. The D/A converters 91, 92 and 93 analogize the luminance data signal DY and the chrominance data signals DB and DR converted previously into serial data by the P/S converters 81, 82 and 83, and thereby provide the reproduced luminance signal Y and component chrominance signals B-Y and R-Y in analog form.

In the case of the VITC signals obtained from the channel decoder 70 during the vertical blanking interval, these are stored temporarily in a buffer memory 501, also shown on FIG. 15, for further processing by the VITC signal processing unit 402.

Figure 22:
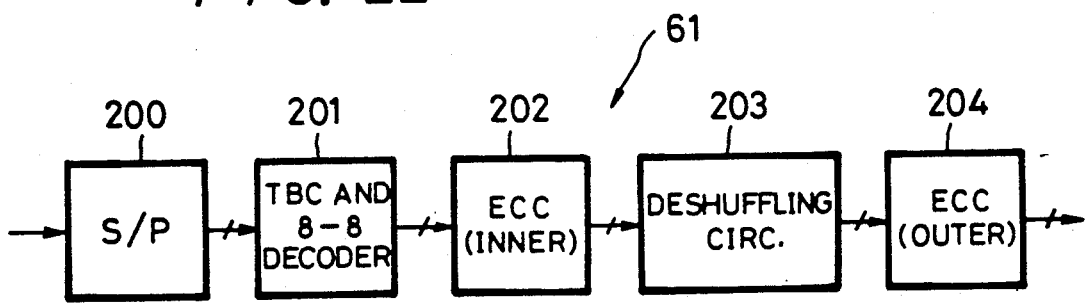
FIG. 22 is a block diagram showing the components of a data processing circuit included in each transmission channel in the reproducing unit of FIG. 21.

Referring now to FIG. 22 which, by way of example, illustrates the data processing circuit 61 acting on the reproduced data in the first channel CH1, it will be seen that each of the data processing circuits 61, 62, 63, - - - 68 comprises a serial-to-parallel (S/P) converter 200 for converting the reproduced data of the respective channel to parallel data. The parallel data from the S/P converter 200 is supplied to a circuit 201 which performs time-base correction thereof and then also performs an 8—8 decoding conversion which corresponds to the 8—8 encoding conversion performed in the circuit 104 of the respective data processing circuit 31 in the recording unit. Circuit 201 also serves to restore the data signals previously inverted by the circuit 104 to their original non-inverted format. Thereafter, a circuit 202 performs error correction using the inner error correction code for the reproduced data of the first channel CH1, whereupon a circuit 203 deshuffles the reproduced data in correspondence to the shuffling thereof in the circuit 102 of the data processing circuit 31 of the recording unit. The resulting video data DA1 of the first channel CH1 is finally subjected to error correction in a circuit 204 which employs the outer correction code therefor.

The other data processing circuits 62, 63, - - - 68 of the reproducing unit 60 are, as previously noted, similar to the above described data processing circuit 61 and similarly act on the reproduced data in the channels CH2, CH3, - - - CH8, respectively, for providing the video data DA2, DA3, - - - DA8 to the channel decoder 70.

As shown on FIG. 15, buffer memory 501 temporarily stores the VITC signal data representing a single coded VITC signal which has been transmitted over 8 separate transmission channels. Under the control of the main central processing unit 312, the user RAM 504 receives these 8 coded VITC signals D0 to Ds1 to be processed under the control of the central processing unit 312 to decode the signals and extract a single error-free VITC signal therefrom. Accordingly, with the use of the working RAM 313, the central processing unit 312 operates to rearrange the data stored in the user RAM 504 into 8 separate VITC signals each including data read by a unique one of the reproducing heads H1 to H8 shown in FIG. 21. These 8 separate VITC signals are then stored in the working RAM 313. Thereafter a conversion and error checking process is carried out pursuant to which the VITC data which had previously been converted to ASCII×2 format prior to recording on the tape 50 is examined to determine whether it conforms to such format. If not, an error flag is set. If however, each byte of VITC data D0 to Ds1 for a given channel possesses an ASCII×2 format, each byte thereafter is converted into binary format and a check sum is calculated in the manner described above with the use of bytes D0 to D15. Bytes $D_{s0}$ and $D_{s1}$ are reconverted to the one byte check sum Ds which then is compared to the newly calculated check sum. If they are not equal, a check sum error flag is set. If, however, the two bytes are equal, a counter is incremented in order to determine the number of apparently error-free VITC signals received. This process is carried out sequentially for each of the VITC signals D0 to Ds1 until it is determined that a third error-free VITC signal has been received, whereupon the bytes D0 to D15 of such VITC signal are reconverted into their original 8 byte format B0 to B7 and, in this format, the VITC signal is supplied through the dual port RAM 311 to the serial interface circuit 309. From the serial interface circuit 309 the VITC signal is supplied through the serial interface 308 to a VITC signal reader 507 of the VITC generator/reader circuit 401 through which the signal is made available to be read by the operator.

In the D-VTR of FIGS. 1-22, the VITC signal is delayed by two fields relative to the corresponding video image data as a result of signal processing unique to the VITC signal. In accordance with one aspect of the present invention, the VITC signal generator 326 is operative to generate a frame data byte B3 of each VITC signal which is one greater than the frame number of the corresponding video image data, thus to compensate for the two field delay experienced by the VITC signal relative to the corresponding image data.

As a consequence of additional data processing unique to VITC data which is carried out after the signal has been reproduced from the tape 50, each VITC signal is delayed by two fields relative to the corresponding reproduced video image data. In accordance with the further aspect of the present invention, the VITC signal processing unit 402 is operative to increment the frame data of each reproduced VITC signal by on which likewise compensates for the two field delay thereof relative to the corresponding image data.

It will be seen that, in the transmission of digital video data signals in accordance with the present invention, for example, in a D-VTR, a luminance signal and first and second chrominance signals, such as, R-Y and B-Y, are individually sampled to provide respective digital luminance data signals DY and first and second digital chrominance data signals DB and DR for forming a high-definition video picture, together with time code data signals representing frame addresses of the digital video data inserted in a vertical blanking intervals thereof. The picture is spatially divided into four horizontally contiguous segments A, B, C and D which are then each time-expanded four times, whereupon the digital luminance data signals Ya-Yd and the first and second digital chrominance data signals Ba-Bd and Ra-Rd are divided into respective sets thereof which each consist of two successive data signals, while the time code signals are divided into a plurality of sets each consisting of two identical time code data signals. The sets of digital luminance and first and second digital chrominance data signals for each of the segments, as well as the sets of time code data signals, are distributed into the transmission channels CH1-CH8 in such a manner that each set of digital luminance data signals is interleaved between sets of the first and second digital chrominance data signals, respectively, in each of the transmission channels, and each of the sets of time code signals is distributed into each of the transmission channels. Further, in accordance with this invention, one of the two successive data signals, that is, the second of the data signals forming each of the sets of digital luminance data signals and of first and second digital chrominance data signals, and one of the two identical time code data signals in each set, is inverted, as in the circuit 104 of each of the data processing circuits 31-38, for obtaining the complement of the one of the two successive data signals in each set which has been inverted, and thereby substantially minimizing any DC or low-frequency component in each of the transmission channels.

Although a specific embodiment of the invention has been described in detail herein with reference to the accompanying drawings, it is to be understood that the invention is not limited to that precise embodiment and that various changes and modifications may be effected therein by one skilled in the art without departing from the scope or spirit of the invention as defined in the appended claims.

What is claimed is:

1. A method of transmitting frames of digital video data signals comprised of digital luminance data signals and first and second digital chrominance data signals, and time code data signals representing addresses of said frames of digital video data, said method comprising the steps of:

dividing said digital luminance data signals into a plurality of sets thereof each consisting of two successive digital luminance data signals;

dividing said first digital chrominance data signals into a plurality of sets thereof, each of said sets of first digital chrominance data signals consisting of two successive first digital chrominance data signals;

dividing said second digital chrominance data signals into a plurality of sets thereof, each of said sets of second digital chrominance data signals consisting of two successive second digital chrominance data signals;

dividing said time code data signals into a plurality of sets thereof, each of said sets of time code data signals consisting of two identical time code data signals;

distributing said sets of digital luminance data signals, said sets of first digital chrominance data signals, said sets of second digital chrominance data signals and said sets of time code data signals into a plurality of transmission channels in such a manner that each said set of digital luminance data signals is interleaved between a set of said first digital chrominance data signals and a set of said second digital chrominance data signals in each of said transmission channels and that each of said sets of time code data signals is distributed into each of said transmission channels; and inverting one of said two successive data signals in each of said sets of digital luminance data signals and in each of said sets of first and second digital chrominance data signals, and one of said two identical time code data signals in each of said sets of time code data signals for obtaining the complement of said one of the two successive data signals in each set which has been inverted and thereby substantially minimizing any DC component in each of said transmission channels.

2. The method according to claim 1, wherein the digital luminance data signals and the first and second digital chrominance data signals are included within a frame of a video image provided for transmission at a time different from that at which time code data signals representing the same frame of said video image are transmitted; and further comprising the step of time shifting said digital luminance data signals and said first and second digital chrominance data signals with respect to said time code data signals such that said digital luminance data signals and said first and second digital chrominance data signals are provided simultaneously with said time code data signals representing the same frame.

3. A method of separating received digital video data signals comprising digital luminance data signals, first and second digital chrominance data signals and time code data signals representing frame addresses of digital video data, wherein said signals are distributed in a plurality of transmission channels such that pairs of digital luminance data signals are interleaved between pairs of first digital chrominance data signals and second digital chrominance data signals, pairs of identical time code data signals are distributed into each of said transmission channels, and one of each pair of digital luminance data signals, first and second digital chrominance data signals and time code data signals are transmitted in said channels in an inverted format, said method comprising the steps of:

restoring each of the inverted digital luminance data signals, first and second digital chrominance data signals and time code data signals to its non-inverted data format; and separating said interleaved digital luminance data signals and first and second digital chrominance data signals, and said time code data signals into respective data channels.

4. The method according to claim 3, further comprising the steps of processing the time code data signals from a plurality of said transmission channels to detect data transmission errors therein, and determining the validity of said time code data signals based on the presence of a plurality of said time code data signals which are free of errors.

5. The method according to claim 4, wherein the step of determining the validity of said time code data signals includes detecting the presence of at least three said time code data signals which are free of errors as an indication of the validity of said time code data signals.

6. The method according to claim 3, wherein the digital luminance data signals and the first and second digital chrominance data signals are included within a frame of a video image transmitted at a time different from that at which time code data signals representing the same frame of said video image are transmitted; and further comprising the step of time shifting said digital luminance data signals and said first and second digital chrominance data signals with respect to said time code data signals such that said digital luminance data signals and said first and second digital chrominance data signals are provided simultaneously with said time code data signals representing the same frame.

7. A method of transmitting frames of digital video data signals and subsequently receiving said transmitted signals, such digital video data signals comprising digital luminance data signals, first and second digital chrominance data signals and time code data signals representing frame addresses of the digital video data, said method comprising the steps of:

dividing each of said digital luminance data signals, first and second digital chrominance data signals and time code data signals into respective pairs of data signals;

distributing said sets of digital luminance data signals, said sets of first digital chrominance data signals, said sets of second digital chrominance data signals and said sets of time code data signals into a plurality of transmission channels in such a manner that each said set of digital luminance data signals is interleaved between a set of said first digital chrominance data signals and a set of said second digital chrominance data signals in each of said transmission channels and that each of said sets of time code data signals is distributed into each of said transmission channels;

inverting one of said two successive data signals in each of said sets of digital luminance data signals and in each of said sets of first and second digital chrominance data signals, and one of said two identical time code data signals in each of said sets of time code data signals for obtaining the complement of said one of the two successive data signals in each set which has been inverted;

receiving the interleaved digital luminance data signals and first and second digital chrominance data signals, and the time code data signals, from said transmission channels;

restoring each inverted data signal that has been received to its non-inverted data format; and separating the interleaved digital luminance data signals and first and second digital chrominance data signals, and said time code data signals, into respective data channels.

* * * * *